United States Patent
Bollapragada et al.

(10) Patent No.: US 11,110,945 B2
(45) Date of Patent: Sep. 7, 2021

(54) INTERMODAL TRANSPORTATION TERMINAL CONTROL SYSTEM AND METHOD

(71) Applicant: General Electric Company, Schenectady, NY (US)

(72) Inventors: Srinivas Bollapragada, Niskayuna, NY (US); Jian Li, Melbourne, FL (US); Albert Mary Henry Stoffels, Austin, TX (US); John Baxley, Rockwall, TX (US); Aguru Niranjan, Atlanta, GA (US); Victor Andres Diaz Romero, Atlanta, GA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 836 days.

(21) Appl. No.: 15/339,060

(22) Filed: Oct. 31, 2016

(65) Prior Publication Data
US 2017/0267267 A1    Sep. 21, 2017

Related U.S. Application Data

(60) Provisional application No. 62/308,922, filed on Mar. 16, 2016.

(51) Int. Cl.
*G06Q 50/28* (2012.01)
*B61L 27/00* (2006.01)
(Continued)

(52) U.S. Cl.
CPC .......... *B61L 27/0027* (2013.01); *B66C 13/48* (2013.01); *G06Q 10/06314* (2013.01); *G06Q 50/28* (2013.01); *B65G 63/004* (2013.01)

(58) Field of Classification Search
None
See application file for complete search history.

(56) References Cited

U.S. PATENT DOCUMENTS

| | | |
|---|---|---|
| 4,973,219 A | 11/1990 | Brickner et al. |
| 7,813,846 B2 | 10/2010 | Wills et al. |

(Continued)

FOREIGN PATENT DOCUMENTS

EP    2492851 A1 *    8/2012    ............ G06Q 10/08

OTHER PUBLICATIONS

Peterson, Harry. Logistics, transportation and distribution: Engineering service and profits. Industrial Engineering. Norcross. Dec. 1993. Issue 12, vol. 25, p. 21-25. https://search.proquest.com/abicomplete/docview/231434583/abstract/58C3D68D8CBA43B0PQ/96?accountid=14753 (Year: 1993).*

(Continued)

*Primary Examiner* — Patricia H Munson
*Assistant Examiner* — Nancy Prasad
(74) *Attorney, Agent, or Firm* — Philip S. Hof; The Small Patent Law Group, LLC

(57) ABSTRACT

An intermodal terminal control system determines characteristics of cargo containers scheduled for receipt into and/or travel out of an intermodal terminal connected with both rail routes and automobile routes, determines characteristics of cargo handling equipment within the intermodal terminal, determines characteristics of rail vehicles scheduled for one or more of entry into or travel out of the intermodal terminal, and determines characteristics of automobile vehicles scheduled for entry into or travel out of the intermodal terminal. The system also determines constraints on cargo handling operations and a plan for the cargo handling equipment to transfer the cargo containers between the different modes of transportation within the intermodal terminal. The plan designates a sequence of operations to be performed in moving the cargo containers with the cargo handling equipment. The plan is based on the characteristics of the cargo (Continued)

containers, the cargo handling equipment, the rail vehicles, and the automobile vehicles.

20 Claims, 4 Drawing Sheets

(51) Int. Cl.
  *G06Q 10/06* (2012.01)
  *B66C 13/48* (2006.01)
  *B65G 63/00* (2006.01)

(56) References Cited

U.S. PATENT DOCUMENTS

| | | | |
|---|---|---|---|
| 8,060,263 B2 | 11/2011 | Muinonen et al. | |
| 8,156,872 B2 | 4/2012 | Hathaway et al. | |
| 8,585,347 B2 | 11/2013 | Lanigan, Sr. et al. | |
| 8,612,287 B2 | 12/2013 | Miller et al. | |
| 2008/0166211 A1* | 7/2008 | Lanigan | B65G 63/004 414/341 |
| 2010/0021272 A1* | 1/2010 | Ward | B65G 57/20 414/137.1 |
| 2012/0054218 A1 | 3/2012 | Ha et al. | |
| 2013/0117057 A1* | 5/2013 | Van Moltke | G06Q 10/025 705/7.13 |
| 2014/0143169 A1* | 5/2014 | Lozito | G06Q 10/08 705/333 |
| 2015/0081278 A1 | 3/2015 | Unno | |

OTHER PUBLICATIONS

Alessandri et al., "Management of intermodal container terminals using feedback control", Intelligent Transportation Systems, 2004. Proceedings. The 7th International IEEE Conference on, pp. 882-887, Oct. 3-6, 2004.

Lewellen et al., "The Rail Yard Manager", Tools with Artificial Intelligence, 1994. Proceedings., Sixth International Conference on, pp. 112-119, Conference Location: New Orleans, LA, Nov. 6-9, 1994.

* cited by examiner

INTERMODAL TRANSPORTATION TERMINAL CONTROL SYSTEM AND METHOD

CROSS-REFERENCE TO RELATED APPLICATIONS

This application claims priority to U.S. Provisional Application No. 62/308,922, filed 16 Mar. 2016, the entire disclosure of which is incorporated herein by reference.

BACKGROUND

Technical Field

Embodiments of the present disclosure generally relate to intermodal terminals or yards, and systems for planning and/or controlling machinery within the terminals or yards.

Discussion of Art

Intermodal containers are shipped using multiple modes of transport including truck, rail, ocean, and air. An intermodal railway terminal (or intermodal rail yard) is an interchange facility, providing the capability for rail carriers and their customers to transfer cargo units (containers and trailers) between different modes of transportation (e.g., between automobiles such as trucks and rail vehicles). These terminals include tracks for loading and unloading rail cars, container storage areas, and paved areas to support lifting equipment (e.g., cranes) and truck movements. A gate area similar to a toll booth is used to control access to the yard and log vehicles in and out.

A large number of planning, scheduling, and sequencing decisions have to be made in managing the yard. These decisions are currently made manually, leading to inefficiencies resulting in higher yard operating costs and lower throughputs.

BRIEF DESCRIPTION

In one embodiment, an intermodal terminal control system includes one or more processors configured to determine characteristics of cargo containers scheduled for one or more of receipt into or travel out of an intermodal terminal connected with both rail routes and automobile routes, determine characteristics of cargo handling equipment within the intermodal terminal, determine characteristics of rail vehicles scheduled for one or more of entry into or travel out of the intermodal terminal, and determine characteristics of automobile vehicles scheduled for entry into or travel out of the intermodal terminal. The one or more processors also are configured to determine one or more constraints on cargo handling operations involving transferring the cargo containers between different modes of transportation in the intermodal terminal. The one or more processors are further configured to determine a plan for the cargo handling equipment to transfer the cargo containers between the different modes of transportation within the intermodal terminal. The plan designates a sequence of operations to be performed in moving the cargo containers with the cargo handling equipment. The plan is determined based on the characteristics of the cargo containers, the characteristics of the cargo handling equipment, the characteristics of the rail vehicles, and the characteristics of the automobile vehicles.

In one embodiment, a method includes determining characteristics of cargo containers scheduled for one or more of receipt into or travel out of an intermodal terminal connected with both rail routes and automobile routes, determining characteristics of cargo handling equipment within the intermodal terminal, determining characteristics of rail vehicles scheduled for one or more of entry into or travel out of the intermodal terminal, determining characteristics of automobile vehicles scheduled for entry into or travel out of the intermodal terminal, determining one or more constraints on cargo handling operations involving transferring the cargo containers between different modes of transportation in the intermodal terminal, and determining a plan for the cargo handling equipment to transfer the cargo containers between the different modes of transportation within the intermodal terminal. The plan designates a sequence of operations to be performed in moving the cargo containers with the cargo handling equipment. The plan is determined based on the characteristics of the cargo containers, the characteristics of the cargo handling equipment, the characteristics of the rail vehicles, and the characteristics of the automobile vehicles.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
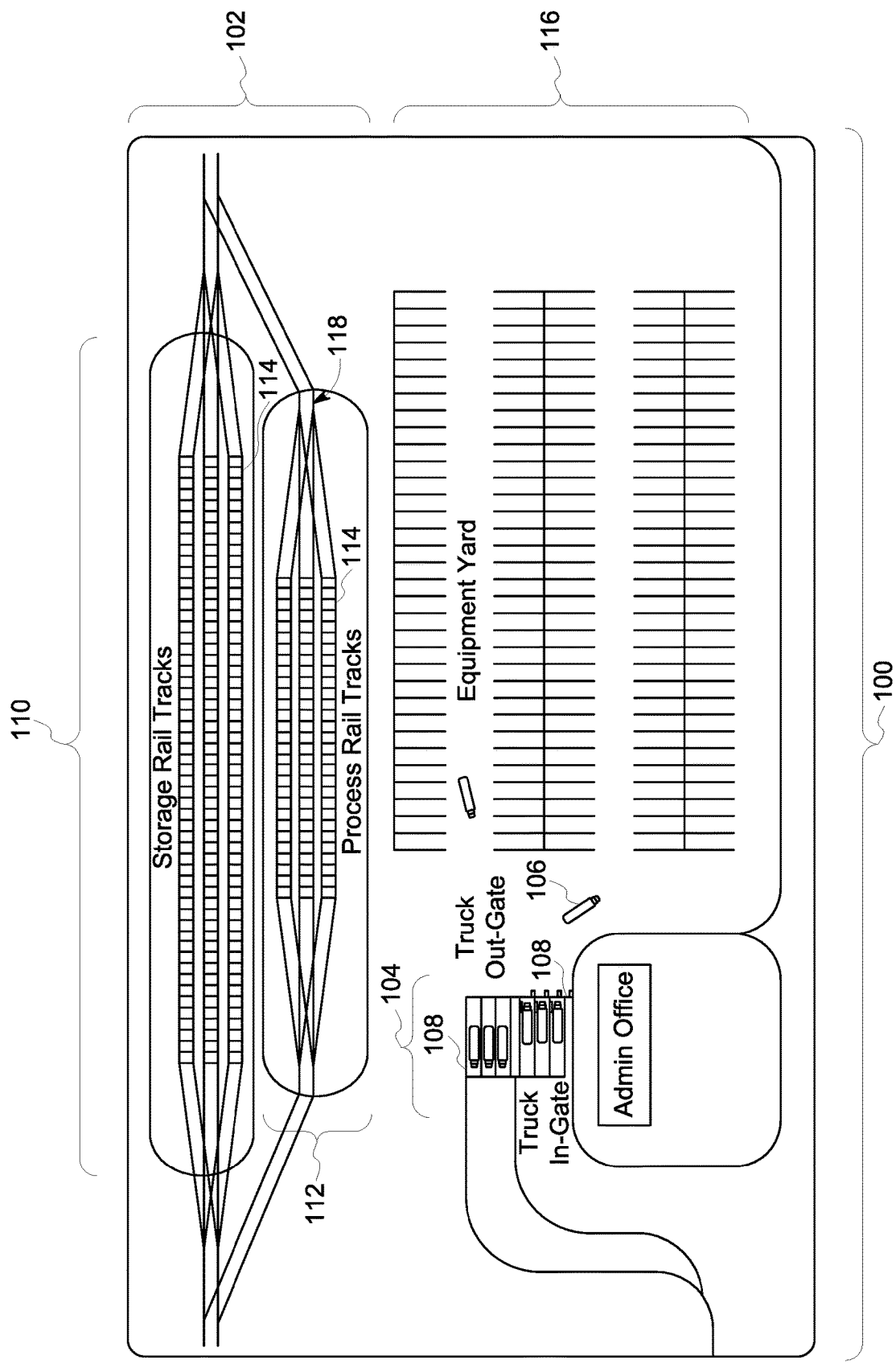
FIG. 1 illustrates one embodiment of an intermodal terminal or railway.

FIG. 1 illustrates one embodiment of an intermodal terminal or railway 100. The intermodal terminal 100 represents an interchange facility that provides the capability for rail carriers and customers to transfer cargo units (containers and trailers) between different modes of transportation (e.g., truck and rail modes of transportation). The terminal 100 includes loading routes 102 (e.g., rail tracks) and paved areas to support lifting equipment, truck movements, and storage areas. A gate area 104 is provided to control access to the terminal 100 and log entry and exit of vehicles 106 in and out of the terminal 100. The gate area 104 can include one or more gates 108 ("Truck In-Gate" and "Truck Out-Gate" in FIG. 1) that monitor entry and/or exit of vehicles 106, such as over-the-road (OTR) trucks, such as by automatically detecting passage of the OTR vehicles 106 through a light beam using a light sensor (e.g., an infrared beam and sensor), through electromagnetic interrogation of radio frequency identification (RFID) tags on the OTR vehicles 106 by RFID readers at the gates 108, manual logging of passage of the OTR vehicles 106, etc.

In the intermodal terminal 100, incoming vehicle systems (e.g., freight trains) bring cargo-carrying cars (e.g., railcars) loaded with containers. These vehicle systems include propulsion-generating vehicles (e.g., locomotives) that pull and/or push one or more non-propulsion-generating vehicles (e.g., railcars). Each of the non-propulsion-generating vehicles can be associated with a unique identification.

Figure 2:
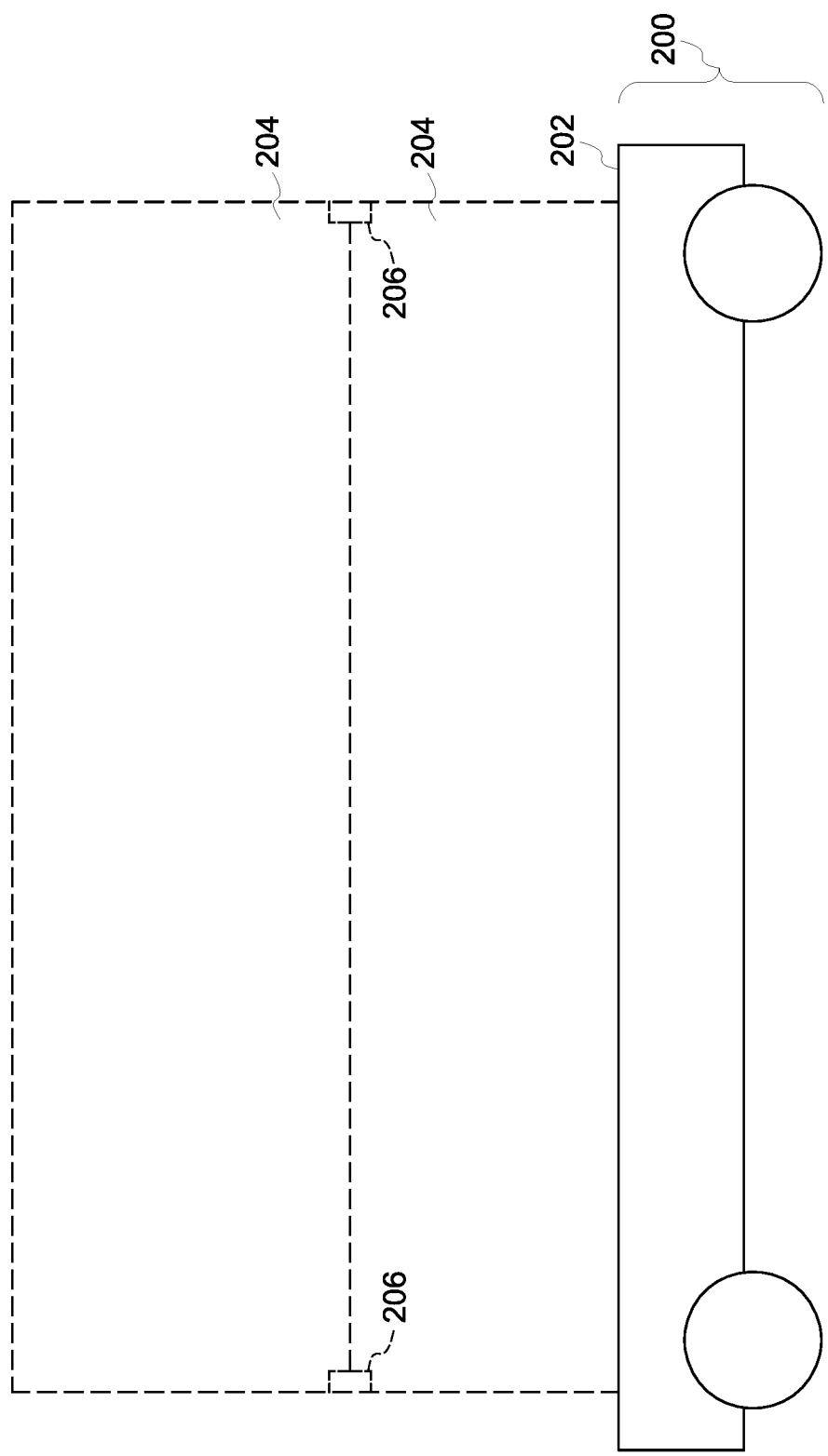
FIG. 2 schematically illustrates one embodiment of a non-propulsion-generating vehicle.

FIG. 2 schematically illustrates one embodiment of a non-propulsion-generating vehicle 200. The vehicle 200 can be referred to as a cargo vehicle. The vehicle 200 represents a platform or flatbed rail car having a series of wells or platforms 202 used to hold and secure containers and/or trailers 204 during transport. Many cargo vehicles 200 are configured with one and up to five wells 202. While the cargo vehicle 200 shown in FIG. 2 includes one well 202, other cargo vehicles 200 can have more than two wells 202. Each well 202 can hold up to three containers 204, although only two are shown in FIG. 2. The containers 204 may be secured together by inter-box connectors (IBCs) 206. Some or all of the incoming containers 204 are unloaded at the terminal 100 (shown in FIG. 1) to be picked up by customers using the vehicles 106. The cargo vehicles 200 are then loaded with new containers 204 and depart on outbound vehicle systems (e.g., trains) from the terminal 100.

Returning to the description of the intermodal terminal 100 shown in FIG. 1, the terminal 100 includes infrastructure and cargo handling equipment (CHE) to execute the transfer of cargo between the two modes of transportation (e.g., from truck-to-rail and/or rail-to-truck). The infrastructure includes storage routes 110 ("Storage Rail Tracks" in FIG. 1) that are a series of routes 114 (e.g., tracks, roads, etc.) used to receive rail vehicle systems arriving into the terminal 100 from other intermodal terminals or locations, facilitate switching of the cargo vehicles 200 within the rail vehicle systems among routes within the terminal 100 to allow for moving and re-sequencing the order of cargo vehicles 200, stage or store the cargo vehicles 200 until needed, to combine or build a vehicle system from one or more cargo vehicles 200 and one or more propulsion-generating vehicles, etc. The terminal 100 also includes processing routes 112 ("Process Rail Tracks" in FIG. 1) that are a series of routes 114 used to unload the cargo units (e.g., containers 204) from arriving cargo vehicles 200 and/or load the cargo units 204 onto the cargo vehicles 200 assigned to a departing vehicle system. Switches 118 represent intersections between the routes that can be actuated to change which route a vehicle travels on after passing through a switch 118.

The gates 108 of the intermodal terminal 100 include a truck in-gate that is a checkpoint through which cargo units are received into the intermodal terminal 100 from the OTR vehicles 106 planned (e.g., scheduled) for rail transport out of the intermodal terminal 100. Once the cargo unit is interchanged (e.g., handed off to the OTR vehicle 106 that exits out of the terminal 100 through the gate 108), legal responsibility for the cargo is transferred from the driver of the OTR vehicle 106 to the rail carrier or owner of the rail vehicle system. The gates 108 also include a truck out-gate that is a checkpoint through which cargo units exit out of the terminal 100 to authorized OTR vehicles 106. Once the cargo unit is interchanged (e.g., left in the terminal 100 form the OTR vehicle 106), legal responsibility for the cargo is transferred from the rail carrier to the driver of the OTR vehicle 106.

An equipment yard 116 of the terminal 100 is a staging area for cargo units, waiting to be loading onto a departing rail vehicle system or for pickup by an OTR vehicle 106 to be delivered to a customer. The equipment yard 116 can include designated parking spaces or areas where equipment and/or containers 204 are placed onto trailers of the vehicles 106 (e.g., platforms with wheels that support the containers 204, but that are not capable of self-propulsion) or on the ground. The terminal 100 may include lifting equipment, such as cranes, used to load or unload cargo units 204 onto or from the vehicles 200. The lifting equipment may also be used to mount or dis-mount containers 204 onto of off of a trailer of the vehicles 106. The intermodal yard 100 may include yard vehicles or trucks, which are vehicles that move cargo units 204 between the equipment yard 116 and the process rail routes 112. The CHE of the terminal 100 includes cranes, grunts (described below), IBCs, hostlers, switches between routes, or other machinery that operate to move other equipment, containers 204, vehicles 200, etc.

A number of planning, sequencing, and scheduling decisions are made in managing the operations in the intermodal terminal 100. Making these decisions manually can result in inefficiencies such as larger than necessary travel distances for container handling equipment, larger than average numbers of lifts per container 204 that is handled, larger than average driver turnaround time (e.g., the time required for a driver of an OTR vehicle 106 to enter into the terminal 100 drop off and/or pick up cargo units 204, and exit out of the terminal 100), and/or larger numbers of cargo units 204 missing the scheduled departing rail vehicle systems. These efficiencies can lead to suboptimal yard throughput and higher than necessary operating costs. The yard throughput represents the rate at which containers 204 are processed per unit time, such as the number of containers 204 that are received into the terminal 100, transferred between modes of transportation, and exit out of the terminal 100 per day.

Figure 3:
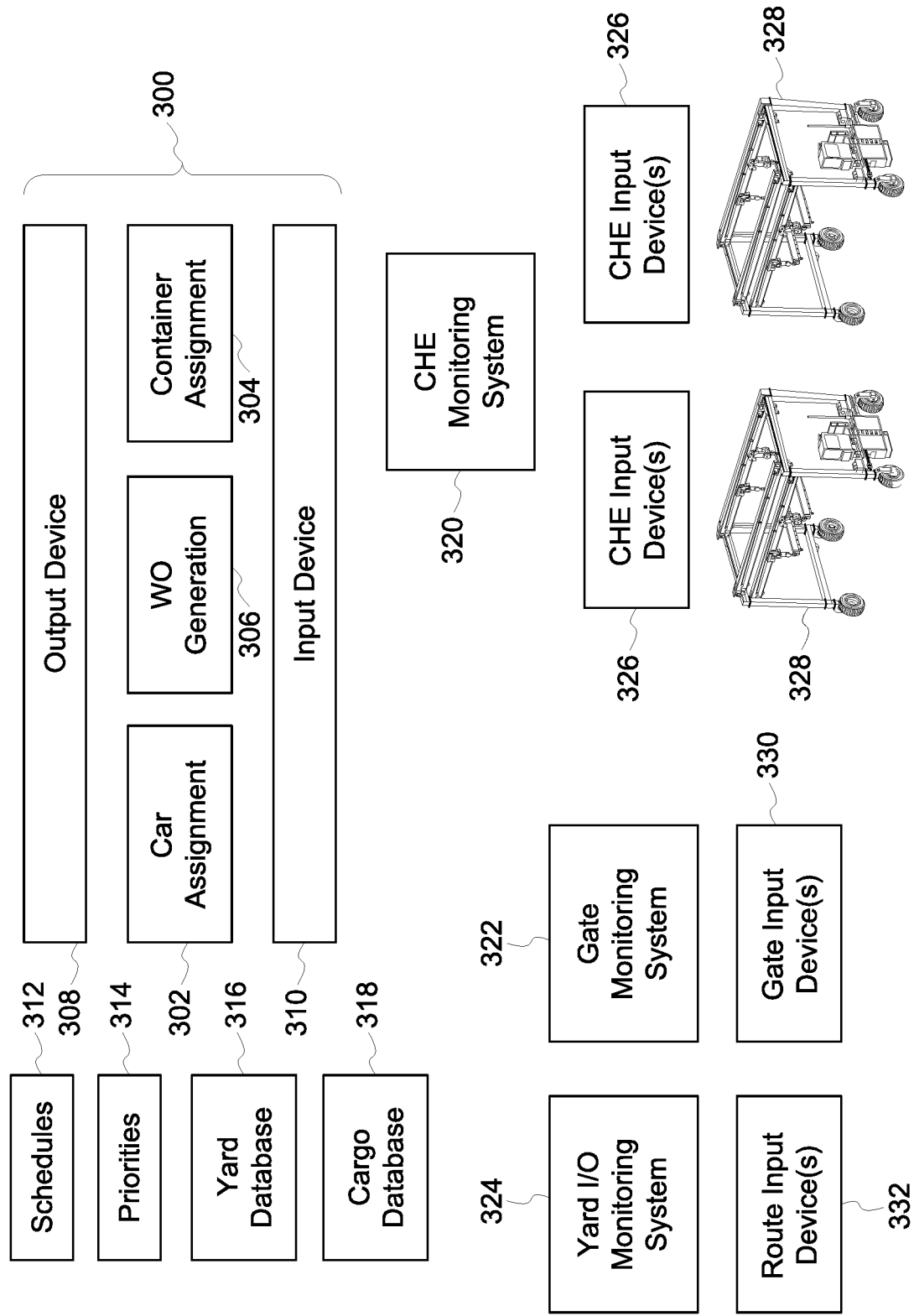
FIG. 3 illustrates one embodiment of an intermodal transportation terminal control system.

FIG. 3 illustrates one embodiment of an intermodal transportation terminal control system 300. The control system 300 generates plans to manage yard operations within the terminal 100 to ensure that the yard throughput is maximized or increased (relative to performing yard operations in another order, performing different operations, and/or performing operations at different times), while efficiently using terminal resources. The plans may be referred to as a yard or intermodal plan, and can dictate schedules for operations to be performed in the terminal 100, such as when and/or where containers 204 are to be moved, when and/or where vehicles 106, 200 are to move, when and/or where rail vehicle systems are to move within the terminal 100, etc. The control system 300 creates the plans to enable freight railroads to efficiently manage the intermodal terminals 100 used by the railroads by maximizing or increasing (relative to performing yard operations in another order, performing different operations, and/or performing operations at different times) the number of containers 204 processed per unit time (e.g., per day), while meeting other goals of the terminal 100.

These additional goals that are met include one or more of planning so that rail vehicle systems arrive into the terminal 100 and depart the terminal 100 on time (e.g., at scheduled times), cargo units 204 that arrive on the inbound rail vehicle systems are available for pickup by the OTR vehicles 106 on time (e.g., at or no later than scheduled times), cargo units 204 arriving into the terminal 100 before a cut off or closing time of the gate 108 make an outbound rail vehicle system, driver turn time to be less than a upper limit time period.

The control system 300 creates the plan for a terminal 100 to meet (e.g., achieve) several different yard goals. These goals include one or more of having at least a designated amount (e.g., all, 90%, 80%, etc.) of vehicle systems arriving into the terminal 100 and/or departing from the terminal 100 on schedule, at least a designated amount (e.g., all, 90%, 80%, etc.) of cargo units 204 that arrive on the inbound vehicle systems being available for pickup by the OTR vehicles 106 on time, at least a designated amount (e.g., all, 90%, 80%, etc.) of cargo units 204 that arrive before a gate cut off time being on an outbound rail vehicle system, and/or the driver turn time of the OTR vehicles 106 to be less than a designated upper time period.

Some goals sought to be achieved by the plan generated by the control system 300 may conflict with each other. For example, the operations needed to be scheduled in the plan to achieve the goal of departing an outbound rail vehicle system at or before a scheduled time may conflict with the operations needed to be scheduled in the plan to ensure that all cargo units 204 that arrive in the terminal 100 before the gate cutoff time are loaded onto that rail vehicle system. Therefore, it may be infeasible to meet all of the goals, all of the time. In some situations, the control system 300 may need to create a plan that causes one goal to not be achieved (e.g., delay an outbound rail vehicle system for departure after the scheduled time) in order to ensure that one or more high priority cargo units 204 are loaded onto the rail vehicle system. A cargo unit 204 may have higher priority than another cargo unit 204 based on the amount that a shipper is paying to move the cargo unit 204, or the time period before the cargo within the cargo unit 204 spoils or wastes.

In order to appropriately trade-off between goals in creating a plan, the control system 300 can associate scores with not meeting various goals. The scores can be quantifiable measures (e.g., numbers) that are proportional to the extent by which the goals are not satisfied. For example, delaying departure of an outbound rail vehicle system by two hours may have a much higher score than delaying the departure by one hour, with the higher score indicating that the longer delay for the departure is less desirable. Not all goals may have equivalent scoring techniques. The magnitude of the scores associated with the goals is chosen to reflect the varying importance of the goals. For example, having 90% of the rail vehicle systems arriving into the terminal 100 on time may have a lower score than having 90% of the rail vehicle systems departing from the terminal 100 on time, thereby indicating that the goal of having the rail vehicle systems depart from the terminal 100 on time is of greater importance or priority than having the rail vehicle systems arrive into the terminal 100 on time. The scale or rate at which the scores change for the different goals may be adjusted to control the efficiency and efficacy of the control system 300 in generating the plan for the terminal 100.

The control system 300 may monitor the efficiency at which the operations within the terminal 100 are progressing according to the plan by measuring various efficiency metrics. The efficiency metrics can include spatial and temporal efficiency metrics. One example of a spatial metric includes a total crane gantry distance. This distance represents the distance that a crane moves in order to move a cargo unit 204 from one location to another. The crane equipment in the terminal 100 may include intermodal yard cranes that can both move relative to the routes 114 (referred to as trolley movement) and move cranes along gantries of the equipment relative to the cargo units 204, while the remainder of the crane equipment remains stationary (referred to as gantry movement). The total crane gantry distance can represent the total distance that a crane or several cranes move along the gantries to move a single cargo unit 204 or to move several cargo units 204 within a designated time period (e.g., per hour, per day, etc.).

Another spatial efficiency metric includes a total crane trolley distance. This distance represents the distance that a crane moves along one or more routes 114 in order to move one or more cargo units 204 from one location to another. The total crane trolley distance can represent the total distance that a crane or several cranes move along the routes 114 to move a single cargo unit 204 or to move several cargo units 204 within a designated time period (e.g., per hour, per day, etc.).

One example of a temporal efficiency metric includes a total crane idle time. This metric represents the time period that one or more, or all, cranes are not moving or otherwise operating to move cargo units 204 within the terminal 100. Another temporal efficiency metric includes a total driver waiting time. This metric represents the time period that one or more, or all, OTR vehicles 106 are stationary and waiting for cargo units 204 to be moved onto the OTR vehicles 106 or off of the OTR vehicles 106.

Another temporal efficiency metric includes an average or median driver turn time. This metric represents the average or median of how long it takes for the OTR vehicles 106 to enter into the terminal 100 via the truck in-gate 108, drop off and/or pick up cargo unit(s) 204, and exit from the terminal 100 via the truck-out gate 108. Another temporal efficiency metric includes a number of missed cargo units 204. This metric represents how many cargo units 204 were not placed onto an outbound rail vehicle system in time before the rail vehicle system left the terminal 100.

The efficiency metrics that are tracked by the control system 300 can have different units of measure. For example, the temporal efficiency metrics may have units of minutes, hours, days, etc., while the spatial efficiency metrics may have units of meters. In order to compare the metrics, the control system 300 can associate scores with the different metrics, similar to the scores associated with the goals described above. Larger values of the scores can indicate less efficient efficiency metrics. For example, an average driver turn time of five hours and a total crane trolley distance of one hundred meters may have the same score (e.g., 50), while an average driver turn time of seven hours and a total crane trolley distance of one hundred twenty meters may have the same, larger score (e.g., 72). The scores may vary along different scales for different metrics. For example, a ten percent increase in one efficiency metric may result in the score for that metric increasing by five percent, while a ten percent in another efficiency metric may result in the score for that metric increasing by twenty percent.

The control system 300 generates or modifies a plan for the operations in the terminal 100 subject to one or more constraints on the plan. A planning constraint includes a limitation or restriction that cannot be violated while generating the plan. For example, one constraint may be a prohibition against generating a plan that directs two different vehicles 106 and/or 200, cranes, or other terminal equipment to be in the exact same location at the exact same time.

Another example of a planning constraint includes CHE capacity limitations. The CHE 328 (shown in FIG. 3) in the terminal 100 is limited by how many containers 204 can be concurrently or simultaneously moved, how far the containers 204 can be moved, how heavy of a container 204 the various CHE can move, etc., due to mechanical or other physical limitations of the CHE. The planning constraints can include CHE travel times or speeds that represent lower or minimum limits on how long is needed for various CHE to move or how fast the various CHE can move. While the CHE 328 shown in FIG. 3 represents a crane, optionally, the CHE can include other equipment, as described herein.

The control system 300 determines the efficiency metrics and, subject to the planning constraints, formulates one or more plans for the terminal 100 that achieves one or more goals described herein. The control system 300 can generate the plan to increase or decrease the efficiency metrics, as applicable, while achieving the goals and not violating the constraints. The control system 300 represents hardware circuitry that includes and/or is connected with one or more processors (e.g., microprocessors, field programmable gate arrays, or integrated circuits) that operate to perform the functions described herein. The processor(s) of the control system 300 may include several processors that each perform one or more different functions than the other processor(s) or several processors that share performance of one or more of the same functions. The processor(s) are described herein as various modules, which can represent different processors performing different functions. One or more embodiments of the inventive subject matter described herein, however, may involve the functions performed by two or more modules being performed by the same processor. The modules can therefore represent different processors in one embodiment. Alternatively, the modules can represent functions performed by the processors, such as instructions or algorithms that direct operations of the processors.

The modules of the control system 300 include a switching and railcar assignment module 302 ("Car Assignment" in FIG. 3), a container location assignment module 304 ("Container Assignment" in FIG. 3), and a work order generation module 306 ("WO Generation" in FIG. 3). These modules 302, 304, 306 can operate in a hierarchical manner to create or modify a plan.

Figure 4:
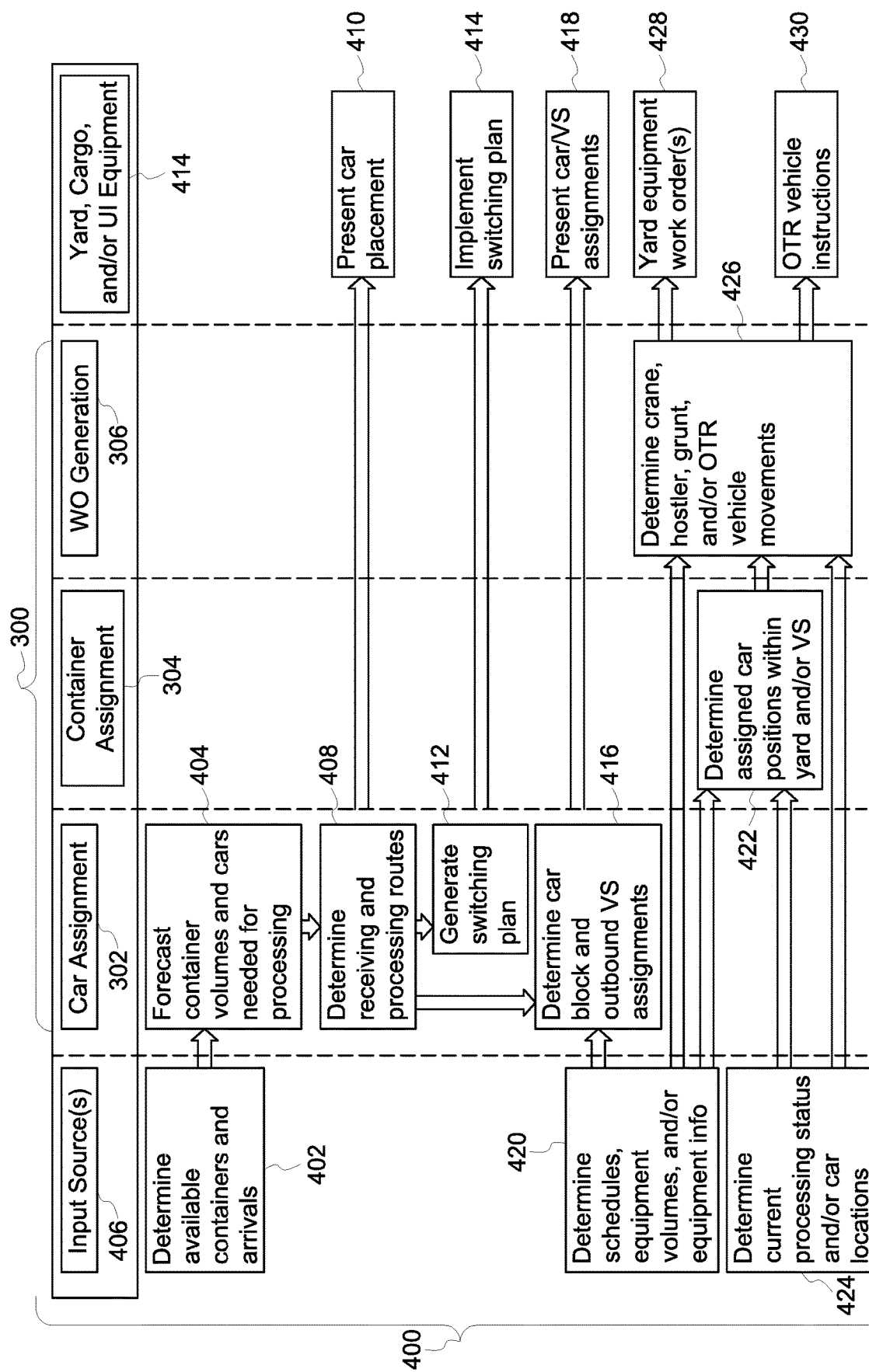
FIG. 4 illustrates a swim lane diagram of one embodiment of operation of the control system.

With continued reference to the control system 300 shown in FIG. 3, FIG. 4 illustrates a swim lane diagram 400 of one embodiment of operation of the control system 300. The swim lane diagram shown in FIG. 4 can represent a flowchart or algorithm of operation of the control system 300, such as the operations of the processors to perform the functions described herein. The functions illustrated in the diagram 400 are shown below the components of the control system 300 and terminal 100 that perform the corresponding functions in one embodiment. Alternatively, one or more of the functions may be partially or entirely performed by another component.

The swim lane diagram may represent or be used to generate instructions (e.g., software) for directing the operations of the processors. The car assignment module 302 determines the containers 204 to be processed by block, decides the processing routes 114 for inbound vehicles 200, and assigns block routes to outbound vehicles 200 before the vehicles 200 are loaded with the containers 204. Using output from the car assignment module 302, the container assignment module 304 determines locations of inbound and outbound containers 204 to efficiently manage the terminal 100 and/or to reduce or minimize stack gaps in the rail vehicle systems to reduce fuel consumption (e.g., relative to other locations of containers 204 on a rail vehicle system).

A stack gap represents a change in height between adjacent vehicles 200 in a rail vehicle system. For example, a stack gap may occur when a first vehicle 200 and a third vehicle 200 in the same vehicle system (e.g., the same train) each has two containers 204 stacked on top of each other, while a second vehicle 200 that is between the first and third vehicles 200 may have only a single container 204 or no containers 204. This stack gap can increase wind resistance (and, therefore, fuel consumption) relative to the first, second, and third vehicles 200 having the same height or number of containers 204.

The WO generation module 306 creates work orders that ensure the containers 204 and CHE are moved in efficient and timely manners. The work orders can be the part of the plan that implements the plan in the terminal 100. In one embodiment, the work orders includes electronic or electromagnetic signals that are communicated from the WO generation module 306 to an output device 308 (e.g., a communication device, such as transceiving circuitry and antenna(s)), for communication to the CHE. Receipt of the signals can cause the CHE to automatically move or otherwise operate according to the plan. For example, the CHE may include transceiving circuitry and antennas that receive the signals and convey the signals to the motors or other equipment that move the CHE according to the plan.

With respect to the car assignment module 302, at 402 (shown in FIG. 4), the car assignment module 302 can obtain information on available containers 204 within the terminal 100 (e.g., containers 204 that are ready to be shipped out of the terminal 100 via one or more vehicles 106, 200) and upcoming arrivals of containers 204. The car assignment module 302 can receive this information from one or more input sources 406. For example, this information can be communicated to the control system 300 (and the car assignment module 302) via an input device 310, such as transceiving equipment and one or more antenna, a keyboard, a microphone, or other device that receives information from another source. In one embodiment, at least some of this information is communicated from or accessed from one or more memory devices 312, 314, 316, 318, such as a computer hard drive, optical disc, etc. These memory devices can represent a single memory device or several different memory devices.

The memory device 312 ("Schedules" in FIG. 3) stores schedules of rail vehicle systems and/or containers 204 entering into and/or leaving the terminal 100, as well as the times and/or dates at which the rail vehicle systems and/or containers 204 are scheduled to enter into and/or leave the terminal 100. The memory device 314 ("Priorities" in FIG. 3) stores quantified priorities of the container 204 or the cargo carried within the containers 204. Containers 204 or cargo having larger values of priorities may be scheduled within the plan for movement within, into, and/or out of the terminal 100 before containers 204 or cargo having lower values of priority.

The memory device 316 ("Yard Database" in FIG. 3) can store information representative of where different routes 114, CHE, gates 108, etc., are located within the terminal 100. The memory device 318 ("Cargo Database" in FIG. 3) can store information representative of where the containers 204 are located within the terminal 100. The information stored in the memory devices 312, 314, 316, 318 may be manually input into the memory devices, may be automatically recorded into the memory devices (e.g., by receiving the information from another system, such as a dispatch or scheduling system, by receiving location information from global positioning system receivers, etc.).

At 404, the car assignment module 302 determines container volumes and vehicles 200 that are needed for processing containers 204 in the terminal 100. The car assignment module 302 can determine the container volumes and needed vehicles 200 based on the information obtained by the car assignment module 302 at 402. The car assignment module 302 can forecast the container volumes and/or the needed vehicles 200 by estimating how many containers 204 are scheduled to arrive at the terminal 100 within an upcoming period of time (e.g., the next day) and/or how many containers 204 are scheduled to depart from the terminal 100 within the upcoming period of time. These estimates can be based on at least some of the information obtained from the input sources 310, such as the schedules obtained from the memory device 312, the rail vehicle system(s) on which the containers 204 are scheduled to be transported, blocks of two or more containers 204 that are to travel together in a rail vehicle system into or out of the terminal 100, etc. The information obtained by the car assignment module 302 at 402 may be updated as actual information regarding the influx and/or output of containers 204 into and/or out of the terminal 100 changes.

At 408, the car assignment module 302 determines routes 114 in the storage routes 110 and/or processing routes 112 on which rail vehicle systems are to travel. The car assignment module 302 can select the routes by determining where various inbound and/or outbound vehicles 200 are to be located for loading and/or unloading cargo containers 204. For example, the car assignment module 302 may select routes 114 in the storage routes 110 on which rail vehicle systems are to be received into the terminal 100 and may select routes 114 in the processing routes 112 on which containers 204 are to be loaded onto and/or unloaded from rail vehicle systems. The car assignment module 302 may select these routes based on the container volumes and/or needed vehicles 200 that are forecast by the car assignment module 302 at 404.

At 410, the car assignment module 302 optionally presents the selected routes on which the rail vehicle systems are to be received and/or on which containers 204 are to be loaded and/or unloaded. This information can be presented on one or more output devices 414 ("Yard, Cargo, and/or UI Equipment" in FIG. 4). The item 414 in FIG. 4 represents the output device 308 or one or more of the CHE.

The car assignment module 302 may generate and communicate one or more electronic signals to the output device 308, which additional or alternatively may represent an electronic display device (e.g., touchscreen, monitor, etc.), speaker, or other device capable of presenting information to a user, to cause the output device 308 to communicate the selected routes. The car assignment module 302 optionally may receive changes to these selected routes from the input device 310. This can allow for a user to change the selected routes, such as in performing "what if" planning scenarios by adjusting various forecasted equipment volumes, available vehicles 200, rates at which the CHE lifts the containers 204, constraints on whether switches between routes 114 can be operated, and inbound estimated times of arrival for vehicle systems.

At 412, the car assignment module 302 determines a switching plan based on the selected routes and/or selected locations for the containers 204 determined at 408. The switching plan includes a schedule for which switches 118 are to be actuated, which direction the switches 118 are to be actuated, and/or when the switches 118 are to be actuated to control which routes the rail vehicles travel on during travel on the routes within the terminal 100.

At 414, the car assignment module 302 optionally implements the switching plan to at least some of the CHE. In one embodiment, the car assignment module 302 creates and communicates an electric or electromagnetic signal to switches 118 that include transceiving circuitry and/or antennas to automatically actuate the switches 118 according to the switching plan. For example, responsive to receiving the switching plan, the switches 118 may autonomously (e.g., without operator intervention) change states at the times dictated by the switching plan. Alternatively, the switching plan may be communicated to the output device 308 or other CHE to be presented to a user for manual control of the switches 118 according to the switching plan.

At 416, the car assignment module 302 determines car block assignments and outbound vehicle system assignments. The car block assignments are designations of which containers 204 are to travel together as a group out of the terminal 100 in a rail vehicle system to the same destination. The outbound vehicle system assignments are designations of which containers 204 or blocks of containers are to be included in the various vehicle systems scheduled for departure from the terminal 100. The car block assignments and outbound vehicle system assignments that are output by the car assignment module 302 may form at least one part of the plan for the terminal 100.

These assignments can be based on a variety of information obtained by the car assignment module 302 at 420. The information that is obtained can include the routes and/or container positions selected at 408, the schedules of the vehicle systems, release time targets of the containers 204, the volume of actual CHE in the terminal 100, the expected or scheduled availability of the CHE in the terminal 100 at different times, the sizes of CHEs in the terminal 100, the types of CHE in the terminal 100, the commodities of the CHE in the terminal 100, the locations of CHE relative to the routes and/or where containers 204 or vehicles 200 are assigned to be located, and/or billing destinations, which can be obtained from one or more of the input sources 406, as shown in FIG. 4.

These assignments can be based on the routes and/or container positions selected at 408. For example, those containers 204 that are scheduled for travel to the same location may be placed next to each other on the same route, and the route on which these containers 204 are placed may be selected based on when the remainder of the vehicle system is to be constructed for departure from the terminal 100.

The car block and/or vehicle system assignments may be based on the schedules of the vehicle systems, such as when the various vehicle systems are scheduled to arrive and/or depart from the terminal 100. The assignments may be based on release time targets of the containers 204, which may be a goal of the terminal 100 (e.g., upper time limits on how long a container 204 is to be in the terminal 100). For example, the module 302 may assign several containers 204 to the same vehicle system that is scheduled to depart before the scheduled departure time of the containers 204.

Optionally, the assignments may be based on the volume of actual CHE in the terminal 100 and/or the expected or scheduled availability of the CHE in the terminal 100 at different times. The assignments may be based on the sizes, types, and commodities of the CHE in the terminal, as well as the locations of CHE relative to the routes and/or where containers 204 or vehicles 200 are assigned to be located. The module 302 can assign several containers 204 that are to be moved on or off of the ground and/or vehicles 200 to be located closer to the CHE that are known or expected to be in the terminal 100 relative to other containers 204. As another example, some cranes may be equipped to move certain types of containers 204 that other cranes cannot move. The vehicles 200 holding these types of containers 204 can be assigned to locations near the cranes that can lift the containers 204. The assignments may be based on billing destinations, such as where the containers 204 are to be shipped to. For example, the containers 204 destined to the same location may be assigned to the same route in the terminal 100.

At 418, the car assignment module 302 optionally presents the container 204 and/or vehicle system assignments determined at 416. This information can be presented on one or more of the output devices 414. In one embodiment, this information is displayed on a user interface of a display device that shows the vehicles 200 on the routes in the terminal 100, along with the status of each vehicle 200, such as inbound to the terminal 100, outbound from the terminal 100, planned for placement on the ground, etc. The block assignments of the containers 204 also may be displayed. A user can select one or more vehicles 200 and/or routes, and changing the assignments as desired using the input device 310. The car assignment module 302 may then modify the assignments based on the user modified assignments.

At 422, the container assignment module 304 determines assigned car positions within the terminal 100 and/or within the vehicle systems in order to ensure that containers 204 are planned to positions within the terminal 100 to efficiently move the containers 204 through the terminal 100. The assigned car positions indicate where a vehicle 200 holding a particular container 204 is located within the terminal 100 and/or within a vehicle system. The containers 204 and other cargo-carrying equipment can arrive in the terminal 100 via rail vehicle systems or OTR vehicles 106, and can be classified as inbound or outbound depending on whether the containers 204 are scheduled for arrival into the terminal 100 or for departure from the terminal 100.

At 424, the container assignment module 304 obtains terminal process information from one or more of the input sources 406. This process information can include current statuses or states of the CHE, the containers 204, the vehicles 200, and/or the OTR vehicles 106. The information can be obtained from a variety of input sources 406, such as a CHE monitoring system 320, a gate monitoring system 322, and/or a yard input/output (I/O) system 324 (shown in FIG. 3). The systems 320, 322, 324 track the current locations, states, and/or operations of the CHE 328, OTR vehicles 106, and/or vehicle systems. Each of the systems 320, 322, 324 represents hardware circuitry that includes and/or is connected with one or more processors (e.g., microprocessors, field programmable gate arrays, or integrated circuits) that operate to perform the functions described herein. The system 320 communicates with CHE input devices 326, which report the status and/or location of various CHE 328. For example, the input devices 326 can include global positioning receivers, keyboards, or other devices that can receive information on current states or locations of the CHE 328 and communicate signals to the system 320. The system 320 may include transceiving circuitry to permit the system 320 to communicate these signals with the container assignment module 304 via one or more wired and/or wireless connections.

The system 322 communicates with gate input devices 330, which record entry and/or exit of the vehicles 106 through the gates 108. For example, the input devices 330 can include switches that are actuated when a gate 108 opens or closes, keyboards, or other devices that can receive information on when a vehicle 106 enters or exits the terminal 100. The input devices 330 can generate and communicate signals representative of entry or exit of the vehicles 106 to the system 322. The system 322 may include transceiving circuitry to permit the system 322 to communicate these signals with the container assignment module 304 via one or more wired and/or wireless connections.

The system 324 communicates with route input devices 332, which track locations of the vehicles 200 and/or vehicle systems on the routes 114 in the terminal 100. For example, the input devices 332 can include roadside transponders, cameras, keyboards, or other devices that receive information indicative of locations of objects on the routes 114. The input devices 332 can generate and communicate signals representative of locations of the vehicles 200 and/or vehicle systems to the system 324. The system 324 may include transceiving circuitry to permit the system 324 to communicate these signals with the container assignment module 304 via one or more wired and/or wireless connections.

The systems 320, 322, 324 can be included in the input sources 406, and the information obtained by the systems 320, 322, 324 can be communicated to the container assignment module 304 at 424. This information is used by the container assignment module 304 to determine the current state of the containers 204, CHE, vehicles 106, 200, vehicle systems, etc., in the process of moving containers 204 through the terminal 100. The module 304 also can obtain additional information determined at 420 from the input sources 406, such as the routes and/or container positions selected at 408, the schedules of the vehicle systems, release time targets of the containers 204, the volume of actual CHE in the terminal 100, the expected or scheduled availability of the CHE in the terminal 100 at different times, the sizes of CHEs in the terminal 100, the types of CHE in the terminal 100, the commodities of the CHE in the terminal 100, the locations of CHE relative to the routes and/or where containers 204 or vehicles 200 are assigned to be located, and/or billing destinations.

Based on some or all of this information, the module 304 determines where various vehicles 200 are to be located on the routes 114 and/or in a vehicle system. For example, the module 304 may assign vehicles 200 or blocks of vehicles 200 to locations on a selected route 114 being used to form a train for departing from the terminal 100 when the vehicles 200 can traverse the routes 114 and switches 118 to the selected route and the train is being built on the selected route. As another example, the module 304 can determine where various vehicles 200 or blocks of vehicles 200 are to be located within a vehicle system based on whether the CHE can move the containers 204 to the vehicles 200 in the locations in the vehicle system.

The module 304 can determine where the containers 204 and vehicles 200 are located in the vehicle systems to avoid stack gaps, as described above. For example, the module 304 can assign the car positions in vehicle systems to avoid placing a vehicle 200 with a shorter stack of containers 204 between vehicles 200 having taller stacks of containers 204 in the vehicle system. The module 304 can assign the car positions within the terminal 100 to reduce the distance between the containers 204 being loaded onto or off of the vehicles 200 and/or to reduce the time needed to load and/or unload the containers 204.

The positions of the vehicles 200 within the vehicle systems and/or within the terminal 100 (e.g., car positions) that are assigned by the module 304 can be included in the plan that is generated by the control system 300. The assigned car positions can be communicated from the container assignment module 304 to the work order generation module 306, as shown in FIG. 4.

At 426, the work order generation module 306 determines movements of equipment within the terminal. The module 306 can create, submit, and manage (e.g., track and set status) work orders to ensure the containers 204 and other cargo-carrying equipment are moved in an efficient and timely manner. The module 306 examines different sequences of moving containers 204 or trailers of the OTR vehicles 106 to get the containers 204 between the assigned car positions in the terminal 100 (e.g., on the ground, on storage routes 110, in the equipment yard 116, etc.) and the assigned car positions on the vehicle systems, as received from the module 304.

With respect to the CHE 328, the generation module 306 can examine different movements of the cranes and containers 204 based on nominal and upper limits on the range of movements of the crane, the time needed for each movement, and/or alternate ways to move the container 204 (e.g., using a hostler). As one example, although it may be possible to move a container 204 from an inbound OTR vehicle 106 directly to a vehicle 200 in a vehicle system, the generation module 306 may instead direct the container 204 to be moved to a wheeled position (e.g., on a trailer in the equipment yard 116 that is not connected with an OTR vehicle 106) due to other constraints, such as an outbound vehicle system scheduled to leave before the container 204 can get to and be loaded on the vehicle system.

Hostler moves in the terminal 100 transport containers 204 and trailers from one wheeled position to another. Depending upon the type of terminal 100 and whether the containers 204 are scheduled inbound to the terminal 100 or outbound from the terminal 100, however, the generation module 306 may direct the hostlers (included in CHE 328) to synchronously move or asynchronously move with movements of cranes. Synchronous movements include the hostler moving a container 204 at the same time that the crane is moving to grab and lift the container 204, while asynchronous movements include the hostler moving the container 204 while the crane remains stationary, and the crane moving only after the hostler has moved the container 204 to a desired or designated location.

For example, for terminals 100 having side-loader or top-pick cranes, the hostler may conduct synchronous moves with the crane. For terminals 100 having overhead cranes, the hostler moves can be executed asynchronously and thereby allow more opportunity for fuel and efficiency savings. The generation module 306 can determine the types, locations, and/or states of the OTR vehicles, cranes and hostlers, and determine movements for the OTR vehicles, cranes, and hostlers to achieve movement of the containers 204 through the terminal 100.

As described above in connection with FIG. 2, some vehicles 200 can carry two or more containers 204 stacked on each other with IBCs 206 securing the containers 204 together. The generation module 306 can examine the status of the cranes (e.g., whether stacking of containers 204 is complete, from 424) the locations of vehicles 200 on which two or more containers 204 are stacked (e.g., from 422), and/or schedules for departure of the vehicle system that includes the stacked containers 204 (e.g., from 420) to determine whether IBCs 206 between the containers 204 are unlocked, whether the IBCs 206 are to be removed (e.g., prior to removing a container 204 from the stack), whether the IBCs 206 are be added or inserted between the containers 204 (e.g., after the crane has finished stacking the containers 204), or whether the IBCs 206 are to be locked to secure the containers 204 together (e.g., after the crane has finished stacking the containers 204 and moved to a safe position for the IBCs 206 to be locked). The generation module 306 can examine the current locations and statuses of the containers 204, cranes, other CHE, and/or OTR vehicles 106 in order to determine which OTR vehicles 106 can move the containers 204, where the OTR vehicles 106 should park in the equipment yard 116 while waiting for pickup or drop off of a container 204, etc., in order to move the containers 204 through the terminal 104 more efficiently.

The generation module 306 can examine different possible combinations or permutations of sequences of movements of the CHE, containers 204, vehicles 106, vehicles 200, etc., in order to determine which combination of movements results in improved efficiency metrics relative to other combinations of movements. The selected combination of movements may be included in the plan for the terminal 100. The plan may be used to generate work orders for the CHE (e.g., at 428) and/or work orders for the drivers of the OTR vehicles 106 (e.g., at 430). The work orders for the CHE may be communicated as electronic signals generated by the generation module 306 to the CHE (e.g., the equipment 414). These signals may be displayed on display screens of the CHE to direct operators of the CHE how to operate the equipment and/or may be communicated to the equipment to automatically control the equipment. For example, responsive to receiving the signals, motors or other components of the CHE may begin operating per the plan as directed by the received signals. The work orders for the OTR vehicle drivers may be communicated to display devices (e.g., equipment 414) accessible to the drivers, such as mobile phones, tablet computers, etc. The work orders may be displayed as instructions to the drivers, such as to drive the OTR vehicle 106 to a designated parking spot in the equipment yard 116 by a designated time, then to drive the OTR vehicle 106 to a designated location in the equipment yard 116 by a later designated time to detach from a trailer having a container 204, then to drive the OTR vehicle 106 to another designated location in the equipment yard 116 by a later designated time to attach another trailer having another container 204, and then to exit the terminal 100 by another designated time.

The work orders or other instructions generated by the generation module 306 (e.g., at 428 and/or 430), the car block assignments and/or outbound vehicle system assignments generated by the car assignment module 302 (e.g., at 416), and/or the assigned car positions in the terminal 100 and/or vehicle systems generated by the container assignment module 304 (e.g., at 422) can form the plan for the terminal 100. The plan may be updated or modified as circumstances change, such as when a vehicle system arrives or departs at a time other than a schedule time, when an OTR vehicle 106 arrives or departs at a time other than a schedule time, when CHE breaks down or needs repair or maintenance, or the like. As described herein, the plan may be used to instruct manual operators of the equipment and/or vehicles to efficiently operate the equipment and/or vehicles to move the containers 204 through the terminal 100, and/or may be used to automatically control operations of the equipment and/or vehicles to efficiently operate the equipment and/or vehicles to move the containers 204 through the terminal 100.

In one embodiment, an intermodal terminal control system includes one or more processors configured to determine characteristics of cargo containers scheduled for one or more of receipt into or travel out of an intermodal terminal connected with both rail routes and automobile routes, determine characteristics of cargo handling equipment within the intermodal terminal, determine characteristics of rail vehicles scheduled for one or more of entry into or travel out of the intermodal terminal, and determine characteristics of automobile vehicles scheduled for entry into or travel out of the intermodal terminal. The one or more processors also are configured to determine one or more constraints on cargo handling operations involving transferring the cargo containers between different modes of transportation in the intermodal terminal. The one or more processors are further configured to determine a plan for the cargo handling equipment to transfer the cargo containers between the different modes of transportation within the intermodal terminal. The plan designates a sequence of operations to be performed in moving the cargo containers with the cargo handling equipment. The plan is determined based on the characteristics of the cargo containers, the characteristics of the cargo handling equipment, the characteristics of the rail vehicles, and the characteristics of the automobile vehicles.

Optionally, the one or more processors are configured to determine the plan to meet a goal of at least a non-zero designated threshold of the rail vehicles arriving into the intermodal terminal on schedule.

Optionally, the one or more processors are configured to determine the plan to meet a goal of at least a non-zero designated threshold of the rail vehicles departing from the intermodal terminal on schedule.

Optionally, the one or more processors are configured to determine the plan to meet a goal of at least a non-zero designated threshold of the cargo containers arriving in the intermodal terminal on one or more of the rail vehicles being available for pickup by one or more of the automobile vehicles on schedule.

Optionally, the one or more processors are configured to determine the plan to meet a goal of at least a non-zero designated threshold of the cargo containers arriving in the intermodal terminal on one or more of the automobile vehicles prior to a designated time being onboard one or more of the rail vehicles prior to a scheduled departure time of the one or more rail vehicles.

Optionally, the one or more processors are configured to determine the plan to meet a goal of a driver turn time of one or more of the automobile vehicles being less than a designated threshold.

Optionally, the one or more processors are configured to determine the plan to meet two or more, but not all, of a first goal of at least a non-zero designated threshold of the rail vehicles arriving into the intermodal terminal on schedule, a second goal of at least a non-zero designated threshold of the rail vehicles departing from the intermodal terminal on schedule, a third goal of at least a non-zero designated threshold of the cargo containers arriving in the intermodal terminal on one or more of the rail vehicles being available for pickup by one or more of the automobile vehicles on schedule, a fourth goal of at least a non-zero designated threshold of the cargo containers arriving in the intermodal terminal on one or more of the automobile vehicles prior to a designated time being onboard one or more of the rail vehicles prior to a scheduled departure time of the one or more rail vehicles, and/or a fifth goal of a driver turn time of one or more of the automobile vehicles being less than a designated threshold.

Optionally, the one or more processors are configured to determine the plan in order to increase an efficiency metric of a total crane gantry distance of the cargo handling equipment relative to another, different plan for the intermodal terminal.

Optionally, the one or more processors are configured to determine the plan in order to increase an efficiency metric of a total crane trolley distance of the cargo handling equipment relative to another, different plan for the intermodal terminal.

Optionally, the one or more processors are configured to determine the plan in order to increase an efficiency metric of a total number of lifts of the cargo containers by the cargo handling equipment relative to another, different plan for the intermodal terminal.

Optionally, the one or more processors are configured to determine the plan in order to increase an efficiency metric of a total idle time of cranes of the cargo handling equipment relative to another, different plan for the intermodal terminal.

Optionally, the one or more processors are configured to determine the plan in order to increase an efficiency metric of a total driver waiting time of the automobile vehicles relative to another, different plan for the intermodal terminal.

Optionally, the one or more processors are configured to determine the plan in order to increase an efficiency metric of a number of the cargo containers that missed outbound departures of the rail vehicles relative to another, different plan for the intermodal terminal.

Optionally, the one or more processors are configured to determine the plan in order to increase efficiency metrics of a total crane gantry distance of the cargo handling equipment, a total crane trolley distance of the cargo handling equipment, a total number of lifts of the cargo containers by the cargo handling equipment, a total idle time of cranes of the cargo handling equipment, a total driver waiting time of the automobile vehicles, and a number of the cargo containers that missed outbound departures of the rail vehicles relative to another, different plan for the intermodal terminal.

Optionally, the one or more processors are configured to determine the plan while avoiding physical conflict between the cargo handling equipment.

Optionally, the one or more processors are configured to determine the plan while avoiding exceeding a capacity of the cargo handling equipment.

Optionally, the one or more processors are configured to determine the plan while avoiding violating a lower limit on travel time of the cargo handling equipment.

Optionally, the one or more processors are configured to determine the plan while avoiding physical conflict between the cargo handling equipment, avoiding exceeding a capacity of the cargo handling equipment, and avoiding violating a lower limit on travel time of the cargo handling equipment.

Optionally, the one or more processors are configured to determine available cargo containers in an equipment yard of the intermodal terminal, determine arrivals of the automobile vehicles into the intermodal terminal, and determine arrivals of the rail vehicles into the intermodal yard, and the one or more processors are configured to determine the plan based on the available cargo containers, the arrivals of the automobile vehicles, and the arrivals of the rail vehicles.

Optionally, the plan includes location assignments of the cargo containers in one or more of routes or rail vehicles in the intermodal terminal.

Optionally, the one or more processors are configured to determine the plan to avoid a stack gap in a rail vehicle system.

Optionally, the one or more processors are configured to determine the plan based on a range of one or more cranes of the cargo handling equipment and a time period required for the one or more cranes to move the cargo containers.

Optionally, the one or more processors are configured to communicate a control signal to one or more of the cargo handling equipment to direct the cargo handling equipment to automatically move one or more of the cargo containers according to the plan.

In one embodiment, a method includes determining characteristics of cargo containers scheduled for one or more of receipt into or travel out of an intermodal terminal connected with both rail routes and automobile routes, determining characteristics of cargo handling equipment within the intermodal terminal, determining characteristics of rail vehicles scheduled for one or more of entry into or travel out of the intermodal terminal, determining characteristics of automobile vehicles scheduled for entry into or travel out of the intermodal terminal, determining one or more constraints on cargo handling operations involving transferring the cargo containers between different modes of transportation in the intermodal terminal, and determining a plan for the cargo handling equipment to transfer the cargo containers between the different modes of transportation within the intermodal terminal. The plan designates a sequence of operations to be performed in moving the cargo containers with the cargo handling equipment. The plan is determined based on the characteristics of the cargo containers, the characteristics of the cargo handling equipment, the characteristics of the rail vehicles, and the characteristics of the automobile vehicles.

Optionally, the plan is determined to meet one or more of a first goal of at least a non-zero designated threshold of the rail vehicles arriving into the intermodal terminal on schedule, a second goal of at least a non-zero designated threshold of the rail vehicles departing from the intermodal terminal on schedule, a third goal of at least a non-zero designated threshold of the cargo containers arriving in the intermodal terminal on one or more of the rail vehicles being available for pickup by one or more of the automobile vehicles on schedule, a fourth goal of at least a non-zero designated threshold of the cargo containers arriving in the intermodal terminal on one or more of the automobile vehicles prior to a designated time being onboard one or more of the rail vehicles prior to a scheduled departure time of the one or more rail vehicles, or a fifth goal of a driver turn time of one or more of the automobile vehicles being less than a designated threshold.

Optionally, the plan is determined in order to increase efficiency metrics of a total crane gantry distance of the cargo handling equipment, a total crane trolley distance of the cargo handling equipment, a total number of lifts of the cargo containers by the cargo handling equipment, a total idle time of cranes of the cargo handling equipment, a total driver waiting time of the automobile vehicles, and a number of the cargo containers that missed outbound departures of the rail vehicles relative to another, different plan for the intermodal terminal.

Optionally, the method also includes communicating a control signal to one or more of the cargo handling equipment to direct the cargo handling equipment to automatically move one or more of the cargo containers according to the plan.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
one or more processors configured to determine characteristics of cargo containers scheduled for one or more of receipt into or travel out of an intermodal terminal connected with different routes for different modes of transportation, determine characteristics of cargo handling equipment associated with the intermodal terminal, determine characteristics of first transportation mode vehicles scheduled for one or more of entry into or travel out of the intermodal terminal, and determine characteristics of different, second transportation mode vehicles scheduled for entry into or travel out of the intermodal terminal, the cargo handling equipment comprising one or more cranes,
the one or more processors also configured to determine constraints on cargo handling operations involving transferring the cargo containers between the different modes of transportation in the intermodal terminal, the constraints comprising avoiding physical conflict between the cargo handling equipment and avoiding exceeding a capacity of the cargo handling equipment,
the one or more processors also configured to determine a plan for the cargo handling equipment to transfer the cargo containers between the different modes of transportation within the intermodal terminal, the plan designating operations to be performed in moving the cargo containers with the cargo handling equipment, wherein the plan is determined based on the characteristics of the cargo containers, the characteristics of the cargo handling equipment, the characteristics of the first transportation mode vehicles, the characteristics of the different, second transportation mode vehicles, and the constraints on the cargo handling operations; and a communication device configured to be operably coupled with the one or more processors and to communicate a control signal to one or more of the cargo handling equipment to one or more of:

display the control signal on a display screen of the cargo handling equipment for directing an operator how to operate the cargo handling equipment according to the plan, or automatically control the cargo handling equipment to move one or more of the cargo containers by causing motors of the one or more cranes to lift and translate the one or more of the cargo containers between locations according to the plan.

2. The system of claim 1, wherein the one or more processors are configured to determine the plan to meet a goal of at least a non-zero designated threshold of the first transportation mode vehicles arriving into the intermodal terminal on schedule.

3. The system of claim 1, wherein the one or more processors are configured to determine the plan to meet a goal of at least a non-zero designated threshold of the first transportation mode vehicles departing from the intermodal terminal on schedule.

4. The system of claim 1, wherein the one or more processors are configured to determine the plan to meet a goal of at least a non-zero designated threshold of the cargo containers arriving in the intermodal terminal on one or more of the first transportation mode vehicles being available for pickup by one or more of the second transportation mode vehicles on schedule.

5. The system of claim 1, wherein the one or more processors are configured to determine the plan to meet a goal of at least a non-zero designated threshold of the cargo containers arriving in the intermodal terminal on one or more of the second transportation mode vehicles prior to a designated time being onboard one or more of the first transportation mode vehicles prior to a scheduled departure time of the one or more first transportation mode vehicles.

6. The system of claim 1, wherein the one or more processors are configured to determine the plan to meet a goal of a driver turn time of one or more of the second transportation mode vehicles being less than a designated threshold.

7. The system of claim 1, wherein the one or more processors are configured to determine the plan to meet two or more, but not all, of:

a first goal of at least a non-zero designated threshold of the first transportation mode vehicles arriving into the intermodal terminal on schedule, a second goal of at least a non-zero designated threshold of the first transportation mode vehicles departing from the intermodal terminal on schedule, a third goal of at least a non-zero designated threshold of the cargo containers arriving in the intermodal terminal on one or more of the first transportation mode vehicles being available for pickup by one or more of the second transportation mode vehicles on schedule, a fourth goal of at least a non-zero designated threshold of the cargo containers arriving in the intermodal terminal on one or more of the second transportation mode vehicles prior to a designated time being onboard one or more of the first transportation mode vehicles prior to a scheduled departure time of the one or more first transportation mode vehicles, or a fifth goal of a driver turn time of one or more of the second transportation mode vehicles being less than a designated threshold.

8. The system of claim 1, wherein the one or more constraints to avoid exceeding the capacity of the cargo handling equipment designate an upper limit corresponding to one or more of a number of the cargo containers that can be concurrently moved by the cargo handling equipment, a distance that the cargo handling equipment can move the cargo containers, a weight of the cargo containers that the cargo handling equipment can move, or a speed at which the cargo handling equipment can move the cargo containers.

9. The system of claim 7, wherein the one or more processors are configured to associate a score with each of the goals that the plan is determined to meet, wherein the scores are quantifiable values that are proportional to extents by which the goals are not satisfied.

10. A system comprising:

one or more processors configured to determine characteristics of cargo containers scheduled for one or more of receipt into or travel out of an intermodal terminal connected with different routes for different modes of transportation, determine characteristics of cargo handling equipment within the intermodal terminal, determine characteristics of first transportation mode vehicles scheduled for one or more of entry into or travel out of the intermodal terminal, and determine characteristics of second transportation mode vehicles scheduled for entry into or travel out of the intermodal terminal, the cargo handling equipment comprising one or more cranes, the one or more processors also configured to determine constraints on cargo handling operations involving transferring the cargo containers between the different modes of transportation in the intermodal terminal, the constraints comprising at least one of avoiding physical conflict between the cargo handling equipment and avoiding exceeding a capacity of the cargo handling equipment, the one or more processors also configured to determine a plan for the cargo handling equipment to transfer the cargo containers between the different modes of transportation within the intermodal terminal, the plan designating a sequence of operations to be performed in moving the cargo containers with the cargo handling equipment, wherein the plan is determined based on the characteristics of the cargo containers, the characteristics of the cargo handling equipment, the characteristics of the first transportation mode vehicles, the characteristics of the second transportation mode vehicles, and the constraints on the cargo handling operations; and a communication device configured to be operably coupled with the one or more processors and to communicate a control signal to one or more of the cargo handling equipment to one or more of:

display the control signal on a display screen of the cargo handling equipment for directing an operator how to operate the cargo handling equipment according to the plan, or automatically control the cargo handling equipment to move one or more of the cargo containers by causing motors of the one or more cranes to lift and translate the one or more of the cargo containers between locations according to the plan,
wherein the one or more processors are configured to determine the plan in order to increase one or more of:
an efficiency metric of a total crane gantry distance of the cargo handling equipment relative to another, different plan for the intermodal terminal,
an efficiency metric of a total crane trolley distance of the cargo handling equipment relative to another, different plan for the intermodal terminal,
an efficiency metric of a total number of lifts of the cargo containers by the cargo handling equipment relative to another, different plan for the intermodal terminal,
an efficiency metric of a total idle time of the one or more cranes of the cargo handling equipment relative to another, different plan for the intermodal terminal,
an efficiency metric of a total driver waiting time of the second transportation mode vehicles relative to another, different plan for the intermodal terminal,
an efficiency metric of a number of the cargo containers that missed outbound departures of the first transportation mode vehicles relative to another, different plan for the intermodal terminal, or
efficiency metrics of a total crane gantry distance of the cargo handling equipment, a total crane trolley distance of the cargo handling equipment, a total number of lifts of the cargo containers by the cargo handling equipment, a total idle time of cranes of the cargo handling equipment, a total driver waiting time of the second transportation mode vehicles, and a number of the cargo containers that missed outbound departures of the first transportation mode vehicles relative to another, different plan for the intermodal terminal.

11. The system of claim 10, wherein the one or more processors are also configured to determine the plan to avoid violating a lower limit on travel time of the cargo handling equipment.

12. The system of claim 10, wherein the one or more processors are configured to determine available cargo containers in an equipment yard of the intermodal terminal, determine arrivals of the second transportation mode vehicles into the intermodal terminal, and determine arrivals of the first transportation mode vehicles into the intermodal yard, and the one or more processors are configured to determine the plan based on the available cargo containers, the arrivals of the second transportation mode vehicles, and the arrivals of the first transportation mode vehicles.

13. The system of claim 10, wherein the plan includes location assignments of the cargo containers in one or more of routes or first transportation mode vehicles in the intermodal terminal.

14. The system of claim 10, wherein the one or more processors are configured to determine the plan to avoid a stack gap in a rail vehicle system.

15. The system of claim 10, wherein the one or more processors are configured to determine the plan based on a range of the one or more cranes of the cargo handling equipment and a time period required for the one or more cranes to move the cargo containers.

16. The system of claim 10, wherein the one or more processors are configured to monitor each efficiency metric over time and associate a score with each efficiency metric, wherein a value of the score corresponds to a tracked efficiency of the efficiency metric.

17. The system of claim 16, wherein the one or more processors are configured to modify the plan or generate a different plan based on the score for each efficiency metric.

18. A method comprising:
determining characteristics of cargo containers scheduled for one or more of receipt into or travel out of an intermodal terminal connected with different routes for different modes of transportation;
determining characteristics of cargo handling equipment within the intermodal terminal, the cargo handling equipment comprising one or more cranes;
determining characteristics of first transportation mode vehicles scheduled for one or more of entry into or travel out of the intermodal terminal;
determining characteristics of second transportation mode vehicles scheduled for entry into or travel out of the intermodal terminal;
determining constraints on cargo handling operations involving transferring the cargo containers between the different modes of transportation in the intermodal terminal, the constraints comprising avoiding physical conflict between the cargo handling equipment and avoiding exceeding a capacity of the cargo handling equipment;
determining a plan for the cargo handling equipment to transfer the cargo containers between the different modes of transportation within the intermodal terminal, the plan designating a sequence of operations to be performed in moving the cargo containers with the cargo handling equipment, wherein the plan is determined based on the characteristics of the cargo containers, the characteristics of the cargo handling equipment, the characteristics of the first transportation mode vehicles, the characteristics of the second transportation mode vehicles, and the constraints on the cargo handling operations; and
communicating a control signal to one or more of the cargo handling equipment to direct the cargo handling equipment to automatically move one or more of the cargo containers by causing motors of the one or more cranes to lift and translate the cargo containers between locations according to the plan.

19. The method of claim 18, wherein the plan is determined to meet one or more of:
a first goal of at least a non-zero designated threshold of the first transportation mode vehicles arriving into the intermodal terminal on schedule,
a second goal of at least a non-zero designated threshold of the first transportation mode vehicles departing from the intermodal terminal on schedule,
a third goal of at least a non-zero designated threshold of the cargo containers arriving in the intermodal terminal on one or more of the first transportation mode vehicles being available for pickup by one or more of the second transportation mode vehicles on schedule,
a fourth goal of at least a non-zero designated threshold of the cargo containers arriving in the intermodal terminal on one or more of the second transportation mode vehicles prior to a designated time being onboard one or more of the first transportation mode vehicles prior to a scheduled departure time of the one or more first transportation mode vehicles, or
a fifth goal of a driver turn time of one or more of the second transportation mode vehicles being less than a designated threshold.

20. The method of claim 18, wherein the plan is determined in order to increase efficiency metrics of a total crane gantry distance of the cargo handling equipment, a total crane trolley distance of the cargo handling equipment, a total number of lifts of the cargo containers by the cargo handling equipment, a total idle time of cranes of the cargo handling equipment, a total driver waiting time of the second transportation mode vehicles, and a number of the cargo containers that missed outbound departures of the first transportation mode vehicles relative to another, different plan for the intermodal terminal.

\* \* \* \* \*